(12) United States Patent
Hughes et al.

(10) Patent No.: US 11,989,468 B1
(45) Date of Patent: May 21, 2024

(54) SYSTEMS AND METHODS FOR IDENTIFYING PRINTERS USING VORONOI DIAGRAMS

(71) Applicant: Xerox Corporation, Norwalk, CT (US)

(72) Inventors: Ethan Hughes, Norwalk, CT (US); Joseph Frederick Casey, Webster, NY (US); Patrick Shuman, Norwalk, CT (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/302,179

(22) Filed: Apr. 18, 2023

(51) Int. Cl.
| G06F 3/12 | (2006.01) |
| G06K 15/02 | (2006.01) |
| G06V 30/32 | (2022.01) |
| G06K 15/00 | (2006.01) |

(52) U.S. Cl.
CPC ............ G06F 3/1231 (2013.01); G06F 3/121 (2013.01); G06V 30/373 (2022.01); G06K 15/402 (2013.01)

(58) Field of Classification Search
None
See application file for complete search history.

(56) References Cited

U.S. PATENT DOCUMENTS

| 6,989,913 | B2* | 1/2006 | Asai ..................... H04N 1/4055 358/1.9 |
| 7,420,709 | B2 | 9/2008 | Damera-Venkata |
| 10,079,960 | B1 | 9/2018 | Subbaian et al. |
| 10,926,135 | B1 | 2/2021 | McKirdy |
| 2007/0160401 | A1* | 7/2007 | Abe ................... H04N 1/00846 400/62 |
| 2009/0034006 | A1 | 2/2009 | Blondal et al. |
| 2011/0063343 | A1* | 3/2011 | Ito ....................... G06K 7/1443 235/462.32 |
| 2017/0094098 | A1* | 3/2017 | Manda ................ H04N 1/6019 |

FOREIGN PATENT DOCUMENTS

| JP | 2004284049 | * 10/2004 | ............... B41J 2/44 |
| JP | 2009100230 | * 5/2009 | ............... B41J 2/52 |
| TW | I693551 B | 5/2020 | |

* cited by examiner

Primary Examiner — Beniyam Menberu
(74) Attorney, Agent, or Firm — Fox Rothschild LLP

(57) ABSTRACT

Systems and methods for identifying a printer that generated a printed document. The methods comprise: generating an electronic image of the printed document; obtaining a dot pattern contained on the printed document via an analysis of the electronic image; overlaying the dot pattern on Voronoi diagrams; selecting a first Voronoi diagram from the Voronoi diagrams that has a single dot of the dot pattern in each of at least some cells thereof; and identifying a printer associated with the first Voronoi diagram that was selected from the Voronoi diagrams. The printer associated with the first Voronoi diagram comprises the printer that generated a printed document.

20 Claims, 11 Drawing Sheets

SYSTEMS AND METHODS FOR IDENTIFYING PRINTERS USING VORONOI DIAGRAMS

BACKGROUND

This disclosure relates to print systems and in particular to techniques for identifying printers that printed documents and automatedly organizing scanned documents in datastore (s) based on the identified printers.

Identification information may be printed on documents for use in subsequently identifying the printers that printed the documents. The identification information may be in a barcode format. Barcodes require a relatively large amount of ink to print. Barcode matching processes (on a large scale) are relatively resource intensive. Also, errors in barcode matching may occur when (i) a print head is malfunctioning or damaged, (ii) there are variations in barcode placement on printed documents, and/or (iii) printer calibration issues exist.

SUMMARY

Embodiments described in this document concern systems and methods for identifying a printer that generated a printed document. The method comprises performing the following operations by computing device(s), processing device(s) or other electronic device(s): generating an electronic image of the printed document; obtaining a dot pattern contained on the printed document via an analysis of the electronic image; overlaying the dot pattern on Voronoi diagrams; selecting a first Voronoi diagram from the Voronoi diagrams that has a single dot of the dot pattern in each of at least some cells thereof; and identifying a printer associated with the first Voronoi diagram that was selected from the Voronoi diagrams. The printer associated with the first Voronoi diagram comprises the printer that generated a printed document. None of the cells of the first Voronoi diagram has two or more dots of the dot pattern contained therein.

In some scenarios, the Voronoi diagram selection operation may involve: eliminating a second Voronoi diagram from further consideration for selection when the second Voronoi diagram has at least one cell with two or more dots of the dot pattern contained therein; eliminating a second Voronoi diagram from further consideration for selection when the second Voronoi diagram has less than a threshold number of cells with dots of the dot pattern contained therein; and/or eliminating a second Voronoi diagram from further consideration for selection when the second Voronoi diagram has at least one cell without any dot of the dot pattern contained therein or located within a distance from a cell boundary thereof.

In those or other scenarios, the method involves: assigning a different dot pattern to each printer of a plurality of printers; generating the Voronoi diagrams from the different dot patterns; obtaining another dot pattern contained on another printed document; overlaying the another dot pattern on the Voronoi diagrams; selecting a second Voronoi diagram from the Voronoi diagrams based on the another dot pattern; and identifying another printer which is associated with the second Voronoi diagram that was selected from the Voronoi diagrams (wherein this identified printer generated the another printed document).

In those or other scenarios, the method involves: performing operations by the printer to print the first dot pattern on the first document during a first period of time; performing operations by the printer to print another different dot pattern on second documents during a second period of time; identifying when the printer printed the first document based on results from analyzing the Voronoi diagram with the first dot pattern overlaid therein; and/or identifying when the printer printed a second document based on results from analyzing the Voronoi diagram with the another different dot pattern overlaid thereon.

In those or other scenarios, the methods involve autonomously or automatedly controlling operations of an electronic device based on the identifying. The electronic device can include, but is not limited to, a printer, a computing device, a server, a database system, and/or a robotic system. The operations can include, but are not limited to: causing electronic images of the printed documents to be stored in datastore(s) so as to be respectively associated with the identified printer(s) and/or organized in accordance with the identified time(s) when the printed document(s) where generated; causing a database system to re-organize electronic images/documents based on the identified printer(s) and/or identified time(s); causing a software application to generate a presentation (for example, a slide show) or other electronic document comprising contents of the scanned printed document(s) based on the identified printer(s) and/or identified time(s); causing a computing device to generate report(s) or perform analytics based on the identified printer(s) and/or identified time(s); causing the identified printer(s) to perform system checks; recalibrating the identified printer(s); causing the identified printer(s) to be repaired or to enable backup printing heads; and/or cause robotic system(s) to obtain and deliver replacement part(s) to the geographic location(s) of the identified printer(s).

The methods described above may be embodied in a system including a processor and memory containing programming instructions that, when executed, will cause the processor to implement the actions described above. Various embodiments also include a computer program product that contains such programming instructions, and a memory containing the computer program product.

BRIEF DESCRIPTION OF THE DRAWINGS

Embodiments will be described with reference to the following drawing figures, in which like numerals represent like items throughout the figures, and in which:

FIGS. 7A, 7A-1, 7B and 7B-1 (collectively referred to herein as "FIG. 7") provides a flow diagram of an illustrative method for identifying a printer that printed a document.

DETAILED DESCRIPTION

This disclosure is not limited to the particular systems, methodologies or protocols described, as these may vary. The terminology used in this description is for describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "storage medium" each refer to a non-transitory device on which computer-readable data, programming instructions or both are stored. Unless the context specifically states that a single device is required or that multiple devices are required, the terms "memory," "computer-readable medium" and "storage medium" include both the singular and plural embodiments, as well as portions of such devices such as memory sectors.

The present solution concerns systems and methods for identifying printers that generated printed documents based on dot patterns and Voronoi diagrams. The present solution is less resource intensive as compared to that of the conventional systems. The present solution can also provide an improved database management system by automating operations for document storage and organization within datastores based on at least the identified printers.

The methods generally comprise: generating an electronic image of the printed document; obtaining a dot pattern contained on the printed document via an analysis of the electronic image; overlaying the dot pattern on Voronoi diagrams; selecting a first Voronoi diagram from the Voronoi diagrams that has a single dot of the dot pattern in each of at least some cells thereof; and identifying a printer associated with the first Voronoi diagram that was selected from the Voronoi diagrams. The printer associated with the first Voronoi diagram comprises the printer that generated a printed document. Some advantages to using the dot patterns instead of traditional barcodes is that the dot patterns use less ink to print and are relatively difficult to see with an unaided eye.

Figure 1:
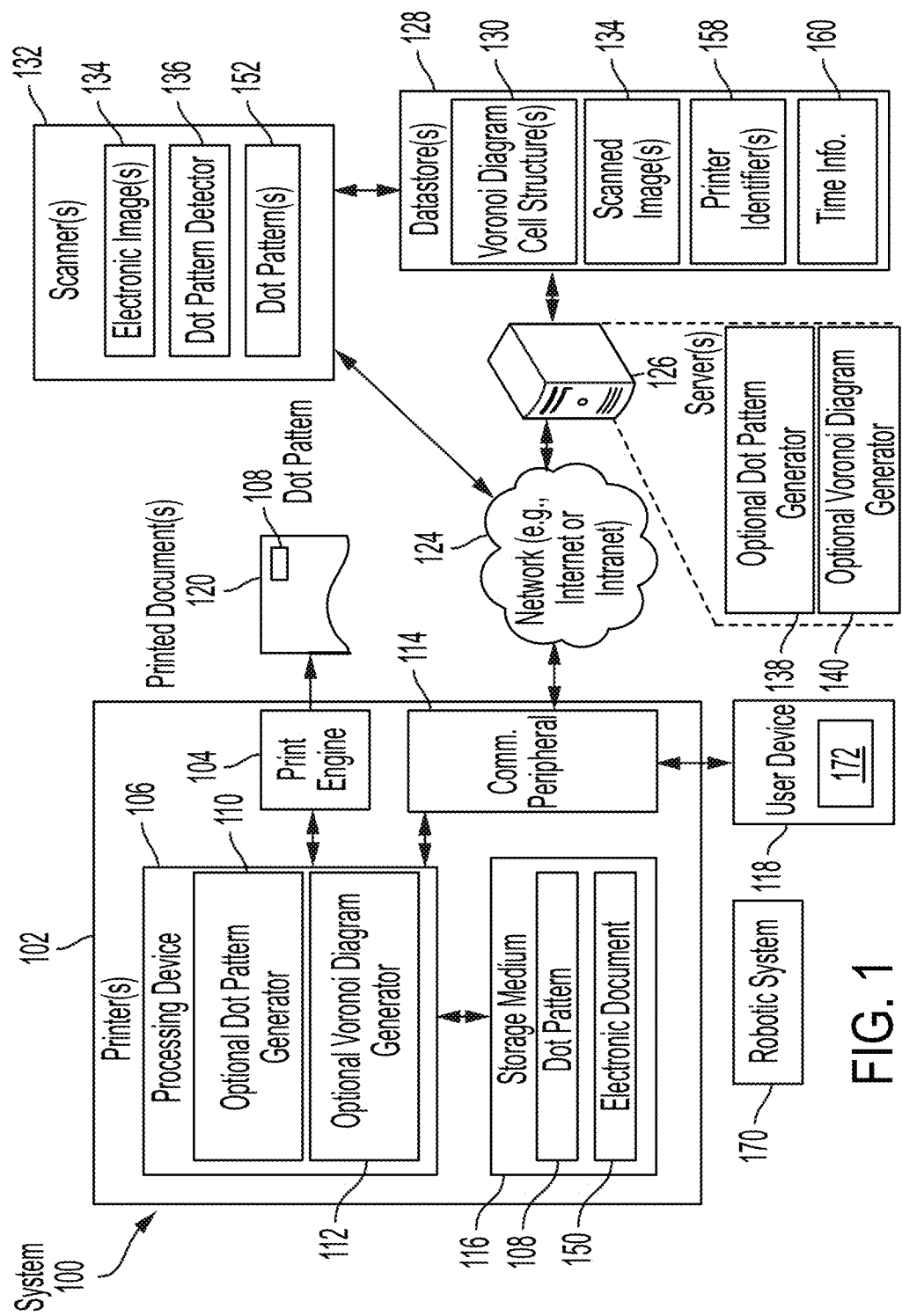
FIG. 1 provides an illustration of a system.
Figure 3:
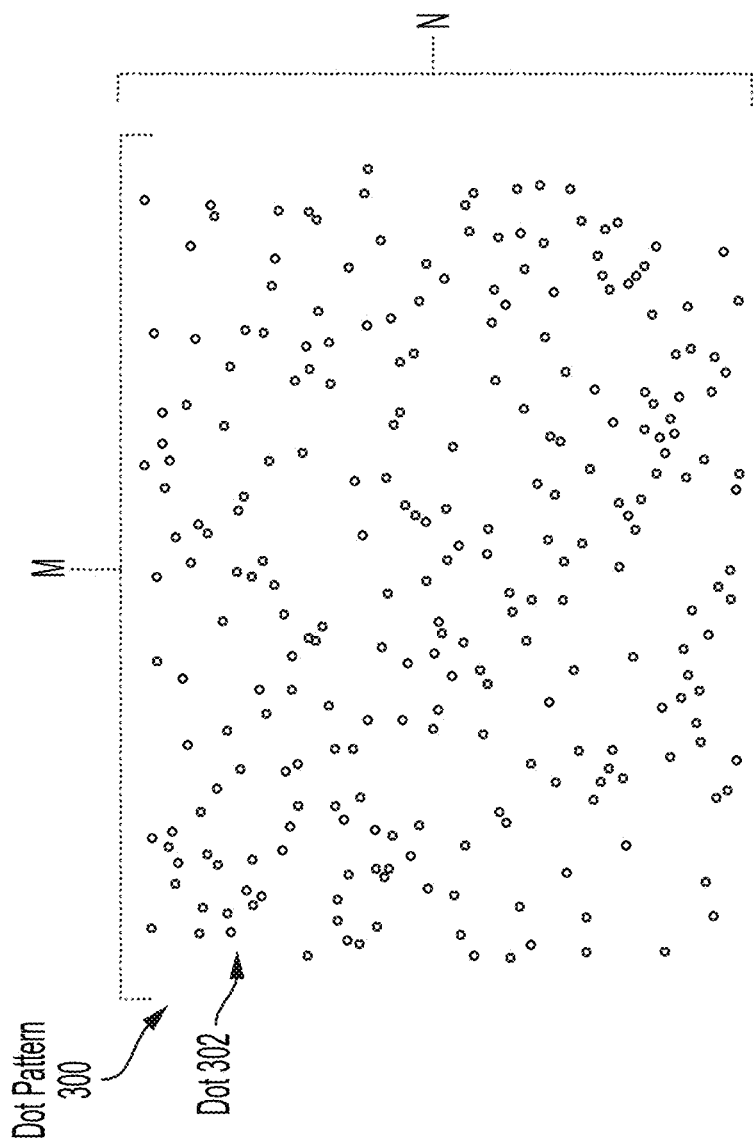
FIG. 3 provides an illustration of dot pattern.

FIG. 1 provides an illustration of a system 100 implementing the present solution. System 100 is generally configured to identify printers 102 that printed documents 120. The printers 102 can include, but are not limited to, ink jet printers, laser printers, and/or toner printers (for example, a xerographic toner printer). A unique dot pattern 108 is generated for each printer. The dot patterns 108 can include, but are not limited to, randomly generated dot patterns and/or halftone screens. An illustrative dot pattern 300 is shown in FIG. 3 which comprises dots arranged in a pattern within a given area having a size M×N. M and N each comprise any number greater than zero. Any known or to be known technique for generating random dot patterns can be used here.

A halftone screen comprises an image with dots of the same or different sizes to generate a gradient-like effect to simulate a continuous tone image. Any known or to be known technique for generating halftone screens can be used here. An illustrative method for generating a halftone screen for a printer is described in U.S. Pat. No. 10,079,960. Conventional printers comprise the same halftone screens. In contrast, the printers 102 of the present solution are assigned different halftone screens which can be used to identify the printers from amongst each other. The dot patterns 108 can be generated by optional dot pattern generators 110, 138 of the printers 102 and/or server(s) 126. The dot patterns 108 are stored in non-transitory computer-readable storage mediums 116 of the printers (for example, a random access memory (RAM), read only memory (ROM) and/or flash memory).

Figure 4:
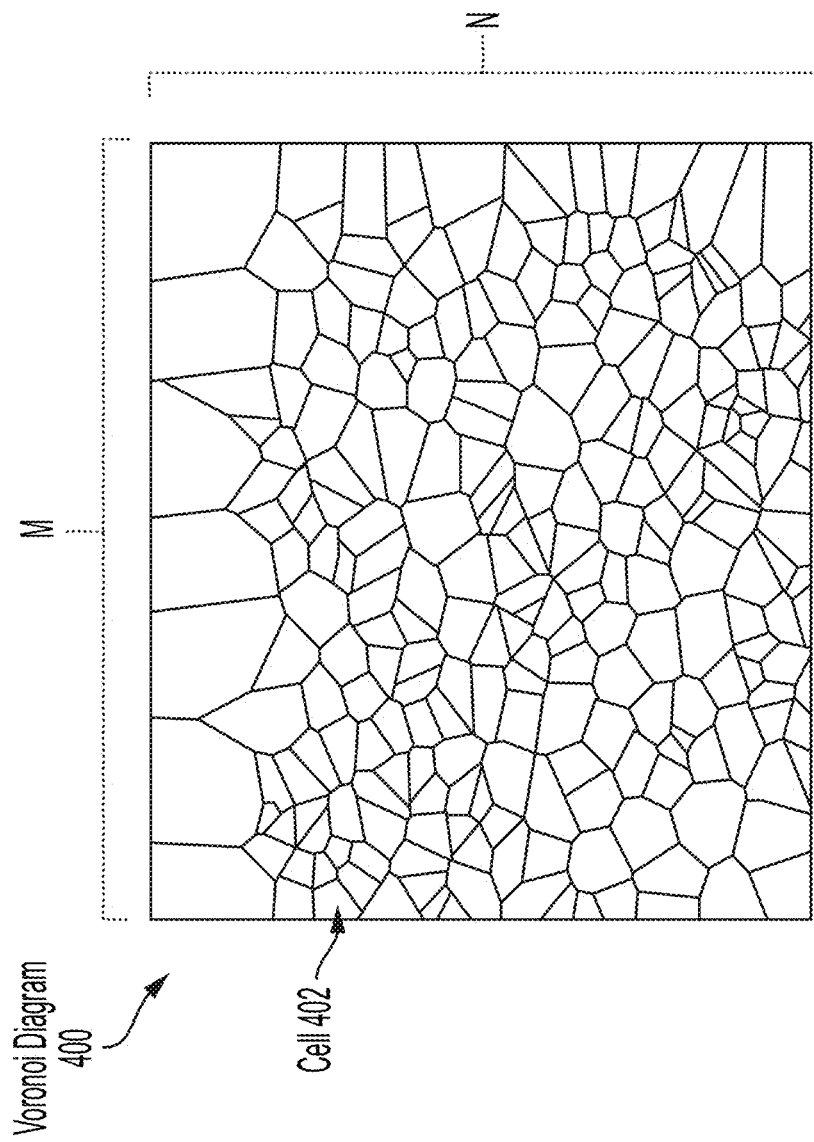
FIG. 4 provides an illustration of a Voronoi diagram.

A Voronoi diagram is also generated for each dot pattern by an optional Voronoi diagram generator 112, 140 of the printer and/or server. Any known or to be known technique for generating Voronoi diagrams can be implemented by the Voronoi diagram generators 112, 140. An illustrative Voronoi diagram 400 is shown in FIG. 4. The Voronoi diagram 400 comprises a plurality of cells 402. A Voronoi diagram cell structure 130 defines the sizes, shapes and relative locations of the cells 402 with a given area having size M×N.

The Voronoi diagram cell structures 130 are stored in datastore(s) 128 which is(are) accessible to the server(s) 126 and/or scanner(s) 132. Each Voronoi diagram cell structure is stored so as to be associated with a printer identifier, a geographic location, day information and/or time information. The printer identifier can include a sequence of number, letters and/or symbols. The geographic location can include, but is not limited to, the location where the printer resides. The day information can include, but is not limited to, the day when calendar day when the Voronoi diagram was generated. The time information can include, but is not limited to, a time of day when the Voronoi diagram was generated, and/or a duration of time that the Voronoi diagram is valid for the printer. With regard to the last type of listed time information, a different dot pattern and/or Voronoi diagram can be generated for a printer each hour, day, week, month, year or other time period (e.g., X hours, where X is any number greater than zero). Such a configuration allows the system to not only identify the printer that printed a document, but also the day/time that the document was printed thereby.

The scanner(s) 132 may be separate from the printer(s) 102 as shown in FIG. 1. Alternatively, the scanner(s) 132 may be provided with the printer(s) 102. The combination of a scanner and a printer is referred to herein as a multi-functional device.

During operation, a processing device 106 of the printer 102 performs operations to cause each printed document 120 to be marked with the dot pattern 108. The document 120 can be printed via a print engine 104 controlled by the processing device 106. The print engine 104 may be a laser engine or an ink jet engine. The marking is achieved by printing the dot pattern 108 at a particular location on the printed document 120. The particular location can include any location on the printed document 120. For example, the dot pattern 108 is printed at the top left corner, the top right corner, the bottom left corner or the bottom right corner of the printed document 120. The present solution is not limited in this regard. The printed document 120 can be a hard copy of an electronic document received from a user device 118 and/or stored in the storage medium 116 of the printer. The electronic document can include, but is not limited to, a digital image.

Status of the print job may be communicated from the printer 102 to the server 126 and/or user device 118 via communication peripheral 114. The communication peripheral 114 may be wired, such as via a universal serial bus (USB) interface, a parallel or serial port, or an Ethernet port. The communication peripheral 114 may also be wireless, configured to communicate with proximate devices via protocols such as via Wi-Fi, Bluetooth, near-field communication (NFC), infrared or other wireless communication protocols known or later developed.

At some later time, a scanner 132 is used to scan the printed document 120 to obtain an electronic image 134. The scanner 132 analyzes the electronic image 134 to detect the dot pattern 108 and extract the dot pattern therefrom. The extracted dot pattern 152 may be stored in a storage medium of the scanner 132 and/or communicated to the server(s) 126 via a network 124 (for example, the Intranet or Internet) for further processing.

The extracted dot pattern 152 is overlaid on the Voronoi diagram cell structures 130 for identifying the printer that printed the document 120 which was scanned by the scanner 132. A printer is identified when the following criteria is met: (i) each cell in a Voronoi diagram has only one dot of the dot pattern 152 entirely or at least partially located therein; and/or (ii) a certain number of cells of the Voronoi diagram have a dot of the dot pattern (entirely or at least partially) located therein or proximate thereto. The term proximate as used here means that the dot is within a pre-defined distance from boundary of a cell in the Voronoi diagram. The pre-defined distance can be selected to account for variations in locations of a dot on printed documents and/or known printing tolerances of the printer.

When a printer is identified, the electronic image 134 may be automatedly or autonomously stored in a datastore 128 so as to be associated with the printer's identifier. For example, the electronic image is stored in a file along with other scanned documents having the same dot pattern contained thereon. The electronic image may also be stored with geographic location information specifying the location where the printer resides, date information specifying the day that the printer printed the document 120 which is associated with the electronic image 134, and/or time information specifying the time that the printer printed the document 120 which is associated with the electronic image 134. The electronic images may be organized in the file or datastore according to the printer identifiers, geographic locations, dates and/or times associated therewith.

Figure 2:
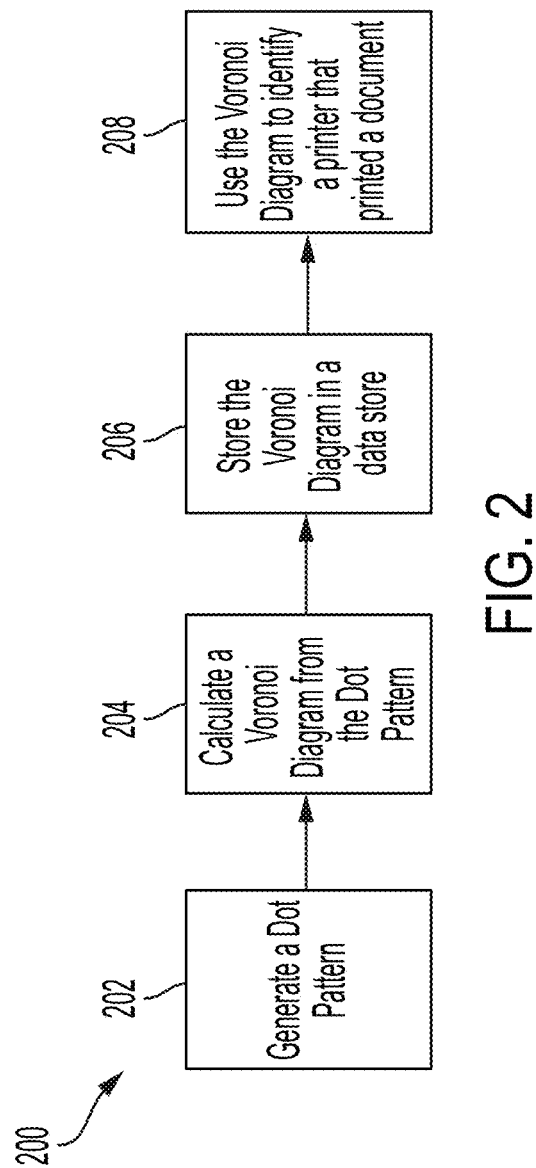
FIG. 2 provides a functional block diagram for operations of the system shown in FIG. 1.

FIG. 2 provides a functional block diagram 200 for operations of the system 100. In block 202, a dot pattern (for example, dot pattern 108 of FIGS. 1 and/or 300 of FIG. 3) is generated that is to be used for identifying a printer (for example, printer 102 of FIG. 1) that prints an electronic document (for example, electronic document 150 of FIG. 1). A Voronoi diagram (for example, Voronoi diagram 400 of FIG. 4) is generated in block 204 from the dot pattern. The Voronoi diagram is stored in a datastore (for example, datastore 128 of FIG. 1), as shown by block 206. In block 208, the Voronoi diagram is used to identify the printer generated a printed document (for example, printed document 120 of FIG. 1).

The operations of block 208 can involve: overlaying the dot pattern on one or more Voronoi diagrams; determining whether all or a certain percentage of the cells of each Voronoi diagram have a single dot of the dot pattern contained therein (entirely or at least partially) or located in proximity thereto; selecting a Voronoi diagram from the Voronoi diagrams based on the determining; and obtaining a printer identifier associated with the selected Voronoi diagram. The selected Voronoi diagram can include the Voronoi diagram that has all or a certain percentage of the cells which each have a single dot of the dot pattern contained therein (entirely or at least partially) or located in proximity thereto. Block 208 can also involve obtaining day and/or time information associated with the selected Voronoi diagram. The day and/or time information indicates when the printed document was generated by the printer.

Figure 5:
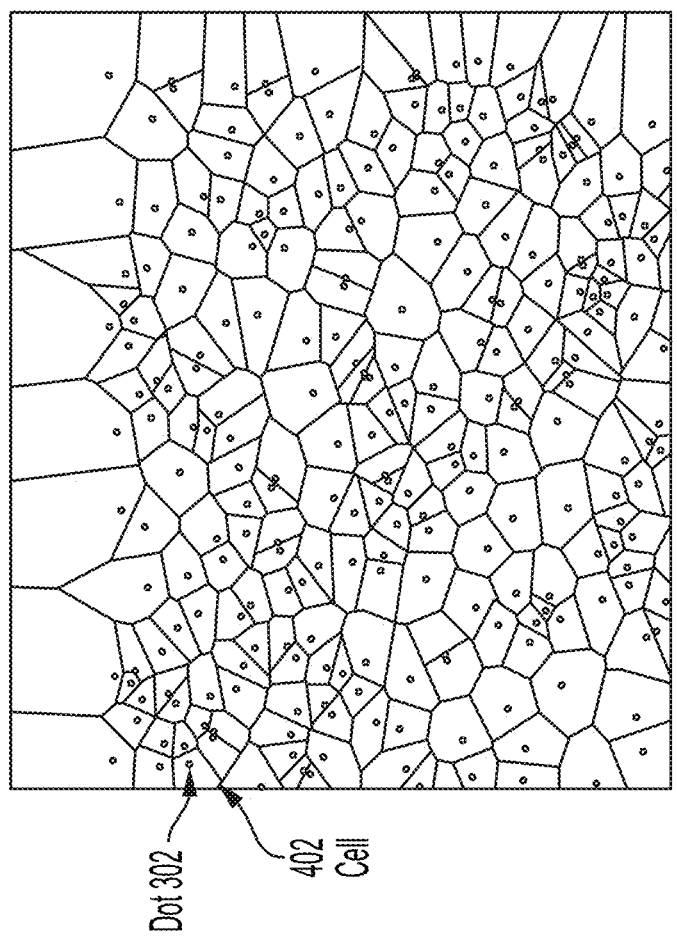
FIG. 5 provides an illustration of the dot pattern of FIG. 3 overlaid on the Voronoi diagram of FIG. 4.

An illustration is provided in FIG. 5 showing the dot pattern 300 of FIG. 4 overlaid on the Voronoi diagram 400 of FIG. 4. Each cell 402 of the Voronoi diagram has a single point 302 of the dot pattern 300 contained therein. Accordingly, the system considers a match to exist between the dot pattern 300 and the Voronoi diagram 400. In effect, the system identifies the printer associated the Voronoi diagram 400 and concludes that the identified printer printed the electronic document from which the dot pattern 300 was obtained.

Figure 6:
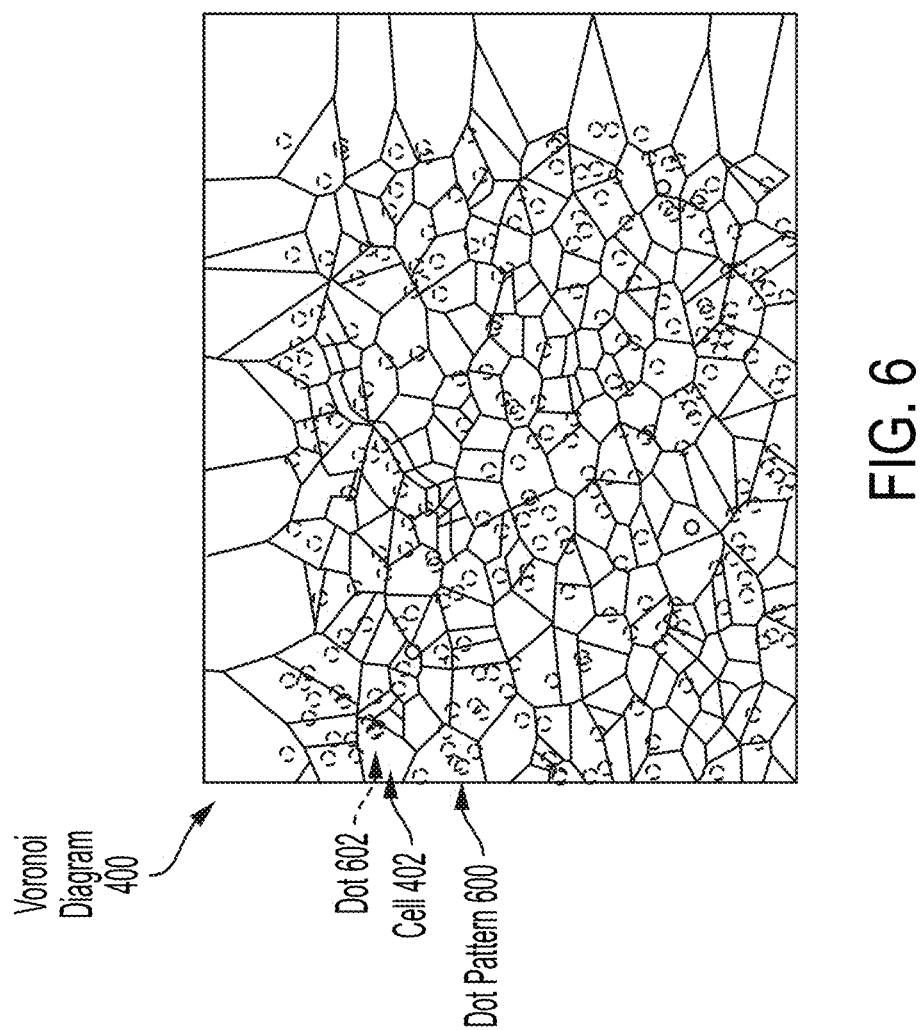
FIG. 6 provides an illustration of another dot pattern overlaid on the Voronoi diagram of FIG. 4.

An illustration is provided in FIG. 6 showing another dot pattern 600 overlaid on the Voronoi diagram 400 of FIG. 4. Some of the cells 402 of the Voronoi diagram 400 have two or more dots 602 of the dot pattern 600 contained therein. Accordingly, the system concludes that a match does not exist between the dot pattern 600 and the Voronoi diagram 400. In effect, the system does not identify the printer associated the Voronoi diagram 400 as being the printer that printed the electronic document from which the dot pattern 600 was obtained.

FIG. 7 provides a flow diagram of an illustrative method 700 for identifying a printer (for example, printer 102 of FIG. 1) that generated a printed document (for example, printed document 120 of FIG. 1). All or a portion of method 700 can be performed by the printer, server(s) (for example, server(s) 126 of FIG. 1), scanner(s) (for example, scanner(s) 132 of FIG. 1), processing device(s) (for example, processing device 106 of FIG. 1), and/or computing device(s) (for example, computing device 800 of FIG. 8). Method 700 can also include more or less operations than those shown in FIG. 7. For example, the operations of block 716-724, 728 can be removed from method 700 in some scenarios. Alternatively or additionally, the operations may be performed in a different order than that shown in FIG. 7.

Figure 7A:
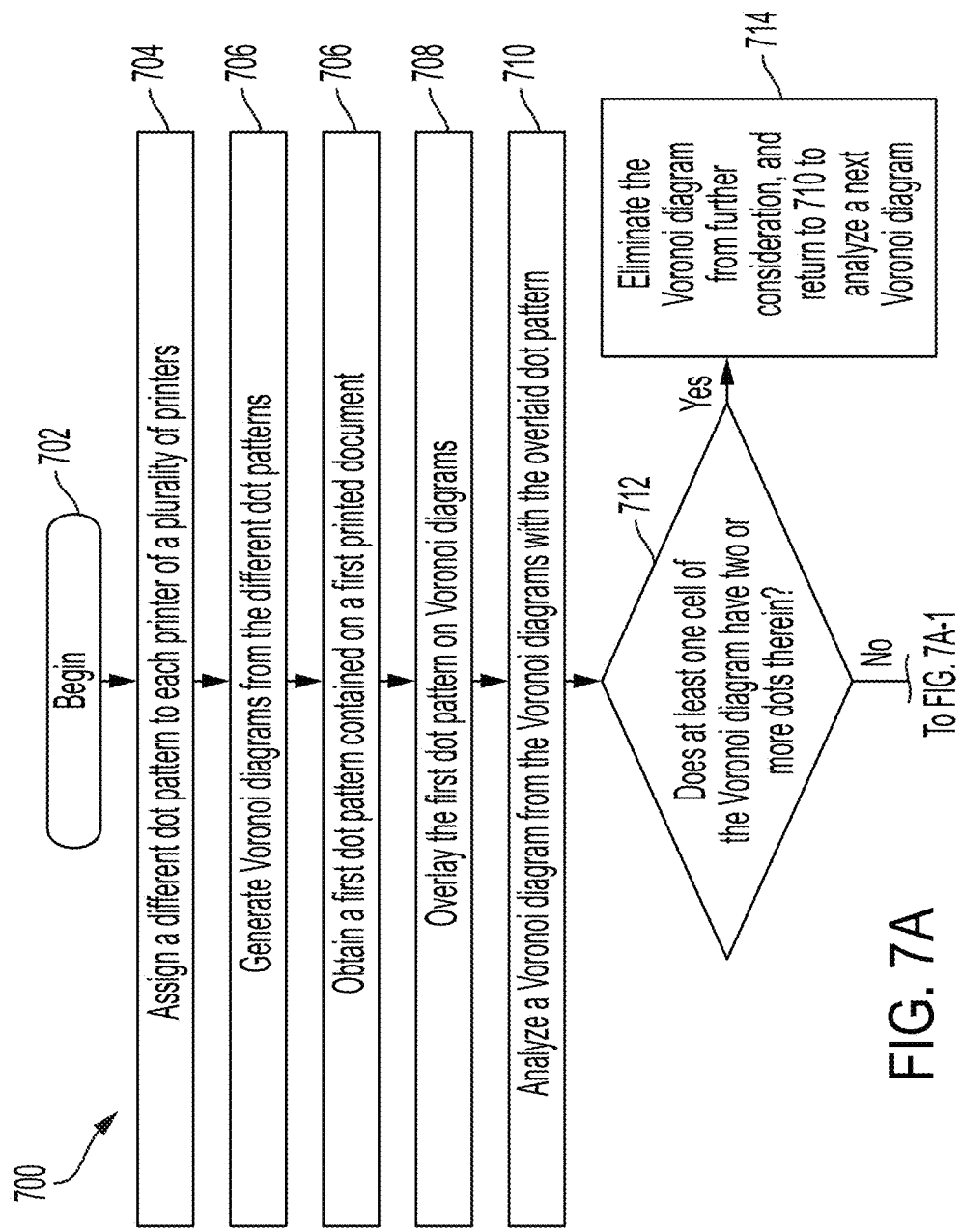
Figures 1, 7A:
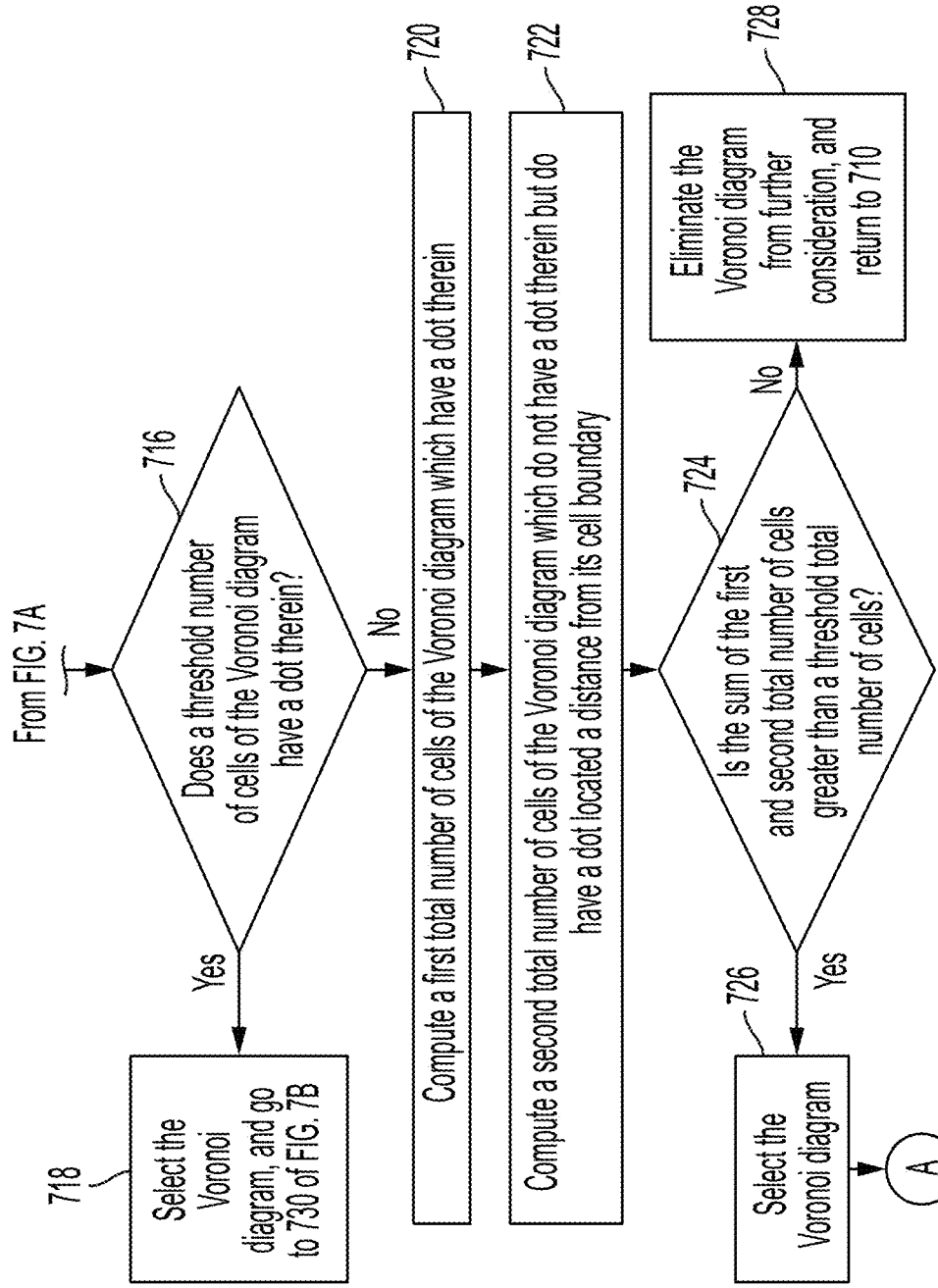

As shown in FIG. 7A, method 700 begins with 702 and continues with 704 where a different dot pattern is assigned to each printer of a plurality of printers. The printers may be part of a fleet of printers owned and/or operated by a business entity. Voronoi diagrams are generated in 706 from the different dot patterns. The Voronoi diagrams may be stored in a datastore (for example, datastore 128 of FIG. 1).

Subsequently in 706, a first dot pattern (for example, dot pattern 108 of FIGS. 1 and/or 300 of FIG. 3) is obtained from a first printed document (for example, printed document 120 of FIG. 1). This can be achieved using a scanner (for example, scanner 132 of FIG. 1) that scans the first printed document to generate an electronic image (for example, electronic image 134 of FIG. 1) thereof. A dot pattern detector (for example, dot pattern detector 136 of FIG. 1) then analyzes the electronic image to detect the dot pattern therein. The detected dot pattern is then extracted or otherwise obtained from the electronic image.

In 708, the first dot pattern is overlaid on the Voronoi diagrams. The Voronoi diagrams may be analyzed in parallel or sequentially. FIG. 7 illustrates the sequential process for Voronoi diagram analysis. Thus, a Voronoi diagram (with the overlaid dot pattern) is analyzed in 710. This analysis is performed to detect or determine whether at least one cell of the Voronoi diagram has two or more dots therein. If so [712:YES], then method 700 continues with 714 where the system returns to 710 so that a next Voronoi diagram can be analyzed. The present Voronoi diagram under analysis may be eliminated or otherwise removed from further consideration by the system for identifying the printer that generated the first printed document.

If not [712:NO], then the system further analyzes the Voronoi diagram in 716 to detect or determine whether a threshold number of cells thereof have a dot therein (or overlaid thereon). If so [716:YES], then the Voronoi diagram is selected by the system in 718. Method 700 then continues to block 730 of FIG. 7B which will be discussed below.

If not [716:NO], then method 700 continues with operations of blocks 720-724. These operations involve: computing a first total number of cells of the Voronoi diagram which have a dot therein; compute a second total number of cells of the Voronoi diagram which do not have a dot therein but do have a dot located a distance from the cell boundary; and determining whether the sum of the first and second total numbers of cells is greater than a threshold total number of cells. If not [724:NO], then method 700 continues with 728 where the system returns to 710 so that a next Voronoi diagram can be analyzed. The present Voronoi diagram under analysis may be eliminated or otherwise removed from further consideration by the system for identifying the printer that generated the first printed document. If so [724:YES], then the Voronoi diagram is selected in 726. Method 700 then continues to 730 of FIG. 7B.

Figure 7B:
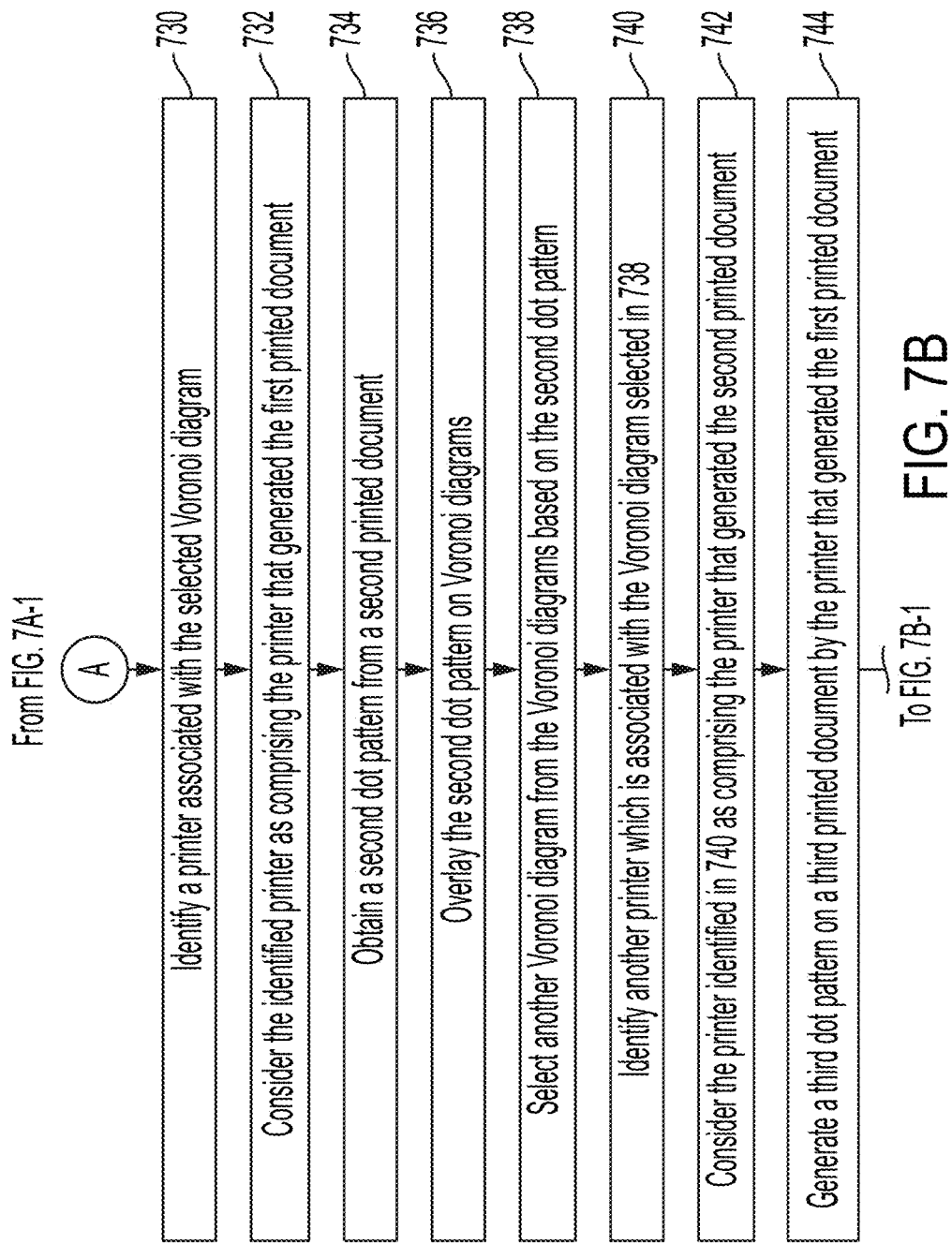
Figures 1, 7B:
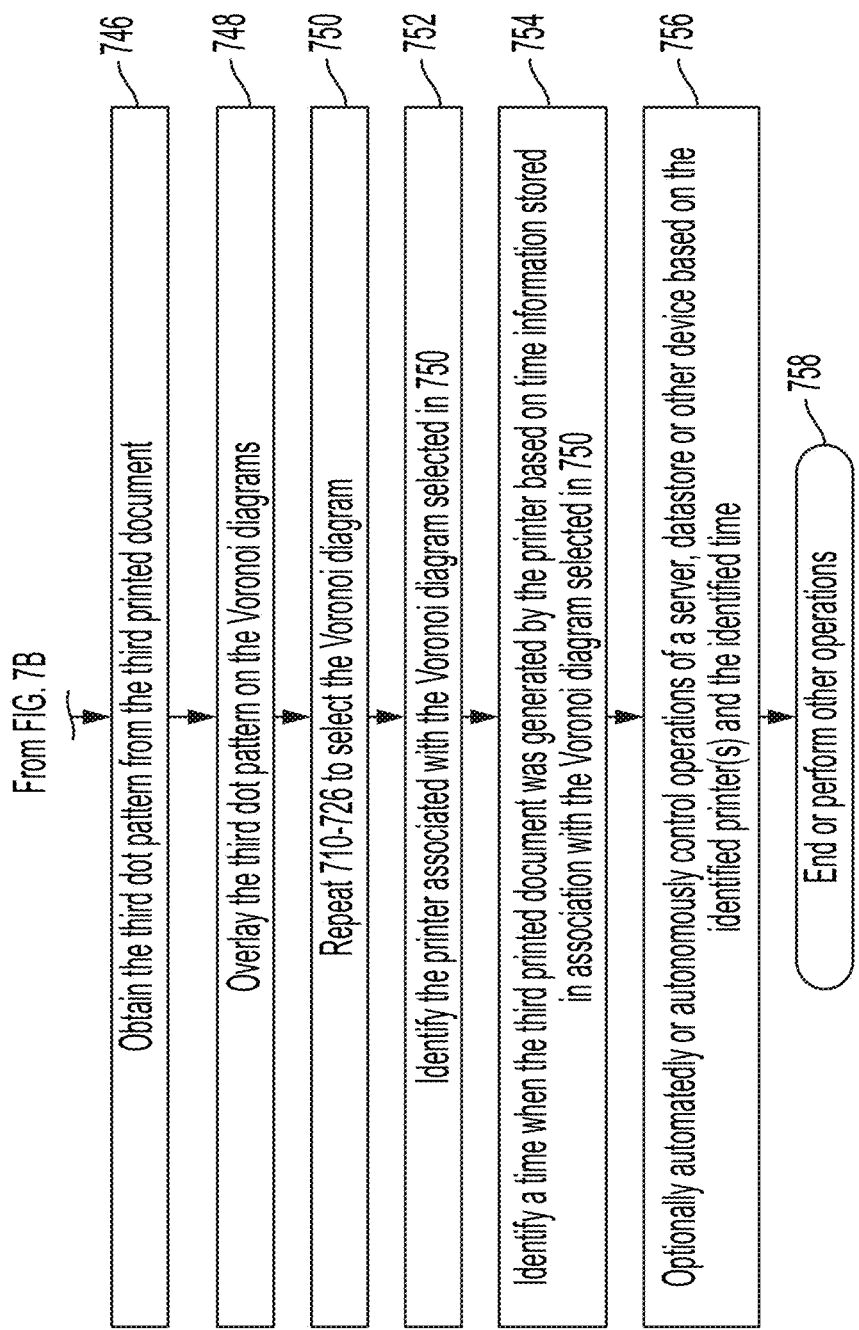

As shown in FIG. 7B, the operations of block 730 involve identifying a printer associated with the selected Voronoi diagram. This identification can be made by accessing a datastore (for example, datastore 128 of FIG. 1) to obtain a printer identifier (for example, printer identifier 158 of FIG. 1) that is stored therein so as to be associated with the selected Voronoi diagram. The identified printer is considered by the system as comprising the printer that generated the first printed document, as shown by 732.

The system may obtain a second dot pattern from a second printed document in 734. The second dot pattern is overlaid on the Voronoi diagrams in 736. The Voronoi diagrams (with the overlaid second dot pattern) are analyzed in 738. One of the Voronoi diagrams is selected as a result of this analysis. Another printer is identified in 740 which is associated with the Voronoi diagram selected in 738. This identified printer is considered by the system as comprising the printer that generated the second printed document, as shown by 742.

In 744, a third printed document is generated by the printer that produced the first printed document. A third dot pattern is provided on the third printed document, rather than the first dot pattern. In some scenarios, a printer may employ a different dot pattern each hour, day, week, year or other specified time period.

The third dot pattern is obtained from the third printed document in 746. In 748, the third dot pattern is overlaid on the Voronoi diagrams. The operations of blocks 710-726 are repeated to select the Voronoi diagram. The printer is identified in 752. The system may determine a time when the third printed document was generated by the printer based on time information (for example, time information 160 of FIG. 1) stored in the datastore so as to be associated with the Voronoi diagram selected in 750. The time information can include, but is not limited to, a day of a week, a hour of a day, and/or a minute of an hour.

In optional 756, the system may perform operations to automatedly or autonomously control operations of a device and/or datastore system based on the identified printer(s) and the identified time. The device can include, but is not limited to, printer(s) (for example, printer(s) 102 of FIG. 1), a computing device (for example, computing device 800 of FIG. 8), a server (for example, server 126 of FIG. 1), a database system (for example, components 126, 128 of FIG. 1), and/or a robotic system (for example, robotic system 170 of FIG. 1). The operations can include, but are not limited to: causing electronic images of the printed documents to be stored in datastore(s) (for example, datastore(s) 128 of FIG. 1) so as to be respectively associated with the identified printer(s) and/or organized in accordance with the identified time(s) when the printed document(s) where generated; causing a database system to re-organize scanned documents based on the identified printer(s) and/or identified time(s); causing a software application (for example, software application 172 of FIG. 1) to generate a presentation (for example, a slide show) or other electronic document comprising contents of the scanned printed document(s) based on the identified printer(s) and/or identified time(s); causing a computing device to generate report(s) or perform analytics based on the identified printer(s) and/or identified time (s); causing the identified printer(s) to perform system checks; recalibrating the identified printer(s); causing the identified printer(s) to be repaired or to enable backup printing heads; and/or cause robotic system(s) to obtain and deliver replacement part(s) to the geographic location(s) of the identified printer(s). The robotic system(s) can include, but is(are) not limited to, an unmanned vehicle (ground or aerial).

Figure 8:
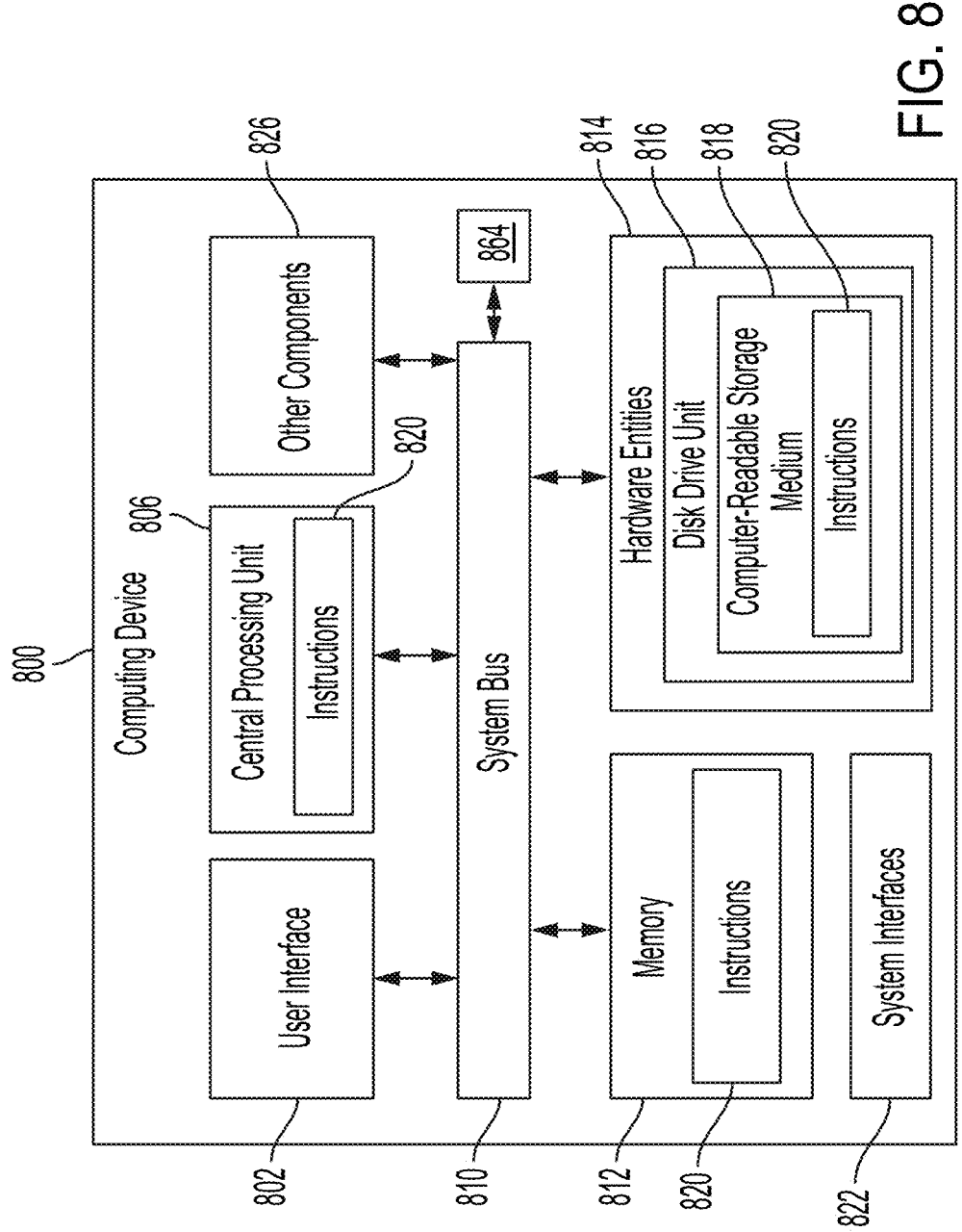
FIG. 8 provides a block diagram of a computing device.

Referring now to FIG. 8, there is provided an illustration of an illustrative architecture for a computing device 800. The printer(s) 102 of FIG. 1, processing device(s) 106 of FIG. 1, user device 118 of FIG. 1, server(s) 126 of FIG. 1 and/or scanner(s) 132 of FIG. 1 is/are the same as or similar to computing device 800. As such, the discussion of computing device 800 is sufficient for understanding the devices 102, 106, 118, 126, 132 of FIG. 1.

Computing device 800 may include more or less components than those shown in FIG. 8. However, the components shown are sufficient to disclose an illustrative solution implementing the present solution. The hardware architecture of FIG. 8 represents one implementation of a representative computing device configured to identify printers that generated printed documents, as described herein. As such, the computing device 800 of FIG. 8 implements at least a portion of the method(s) described herein.

Some or all components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a central processing unit (CPU) 806, a system bus 810, a memory 812 connected to and accessible by other portions of computing device 800 through system bus 810, a system interface 822, an optional wireless communication device 864, and hardware entities 814 connected to system bus 810. The user interface can include input devices and output devices, which facilitate user-software interactions for controlling operations of the computing device 800. The input devices include, but are not limited to, a physical and/or touch keyboard. The input devices can be connected to the computing device 800 via a wired or wireless connection (e.g., a Bluetooth® connection). The output devices include, but are not limited to, a speaker, a display, and/or light emitting diodes.

System interface 822 is configured to facilitate wired and/or wireless communications to and from external devices (e.g., network nodes such as access points, etc.). In some scenarios, the wireless communication device 864 is provided in addition to the system interface 822 for facilitating wireless communications to and from external devices. If both components 822 and 864 are wireless communication enabled, then they may employ different wireless communication technology.

At least some of the hardware entities 814 perform actions involving access to and use of memory 412, which can be a RAM, a disk drive, flash memory, a compact disc ROM (CD-ROM) and/or another hardware device that is capable of storing instructions and data. Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

The above-disclosed features and functions, as well as alternatives, may be combined, into many other different systems or applications. Various presently unforeseen or unanticipated alternatives, modifications, variations or improvements may be made by those skilled in the art, each of which is also intended to be encompassed by the disclosed embodiments.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for identifying a printer that generated a printed document, comprising:
   generating an electronic image of the printed document;
   obtaining, by the computing device, a dot pattern contained on the printed document via an analysis of the electronic image;
   overlaying, by the computing device, the dot pattern on Voronoi diagrams;
   selecting, by the computing device, a first Voronoi diagram from the Voronoi diagrams that has a single dot of the dot pattern in each of at least some cells thereof; and
   identifying, by the computing device, a printer associated with the first Voronoi diagram that was selected from the Voronoi diagrams;
   wherein the printer associated with the first Voronoi diagram comprises the printer that generated a printed document.

2. The method according to claim 1, further comprising autonomously or automatedly controlling operations of an electronic device based on the identifying.

3. The method according to claim 1, wherein none of the cells of the first Voronoi diagram has two or more dots of the dot pattern contained therein.

4. The method according to claim 1, wherein the selecting the first Voronoi diagram from the Voronoi diagrams comprises eliminating a second Voronoi diagram from further consideration for selection when the second Voronoi diagram has at least one cell with two or more dots of the dot pattern contained therein.

5. The method according to claim 1, wherein the selecting the first Voronoi diagram from the Voronoi diagrams comprises eliminating a second Voronoi diagram from further consideration for selection when the second Voronoi diagram has less than a threshold number of cells with dots of the dot pattern contained therein.

6. The method according to claim 1, wherein the selecting the first Voronoi diagram from the Voronoi diagrams comprises eliminating a second Voronoi diagram from further consideration for selection when the second Voronoi diagram has at least one cell without any dot of the dot pattern contained therein or located within a distance from a cell boundary thereof.

7. The method according to claim 1, further comprising assigning a different dot pattern to each printer of a plurality of printers.

8. The method according to claim 7, further comprising generating the Voronoi diagrams from the different dot patterns.

9. The method according to claim 8, further comprising:
   obtaining, by the computing device, another dot pattern contained on another printed document;
   overlaying, by the computing device, the another dot pattern on the Voronoi diagrams;
   selecting, by the computing device, a second Voronoi diagram from the Voronoi diagrams based on the another dot pattern; and
   identifying, by the computing device, another printer which is associated with the second Voronoi diagram that was selected from the Voronoi diagrams;
   wherein the another printer generated the another printed document.

10. The method according to claim 1, wherein the dot pattern was printed on first documents by the printer during a first period of time and another different dot pattern was printed on second documents by the printer during a second period of time.

11. The method according to claim 10, further comprising identifying, by the computing device, when the printer printed one of the second documents based on results from analyzing the Voronoi diagram with the another different dot pattern overlaid thereon.

12. A system, comprising:
   a processor; and a non-transitory computer-readable storage medium comprising programming instructions that are configured to cause the processor to implement a method for identifying a printer that generated a printed document, wherein the programming instructions comprise instructions to:

generate an electronic image of the printed document;

obtain a dot pattern contained on the printed document via an analysis of the electronic image;

overlay the dot pattern on Voronoi diagrams;

select a first Voronoi diagram from the Voronoi diagrams that has a single dot of the dot pattern in each of at least some cells thereof; and identify a printer associated with the first Voronoi diagram that was selected from the Voronoi diagrams;

wherein the printer associated with the first Voronoi diagram comprises the printer that generated a printed document.

13. The system according to claim 12, wherein none of the cells of the first Voronoi diagram has two or more dots of the dot pattern contained therein.

14. The system according to claim 12, wherein the programming instructions comprise instructions to eliminate a second Voronoi diagram from further consideration for selection when the second Voronoi diagram has at least one cell with two or more dots of the dot pattern contained therein.

15. The system according to claim 12, wherein the programming instructions comprise instructions to eliminate a second Voronoi diagram from further consideration for selection when the second Voronoi diagram has less than a threshold number of cells with dots of the dot pattern contained therein.

16. The system according to claim 12, wherein the programming instructions comprise instructions to eliminate a second Voronoi diagram from further consideration for selection when the second Voronoi diagram has at least one cell without any dot of the dot pattern contained therein or located within a distance from a cell boundary thereof.

17. The system according to claim 12, the programming instructions comprise instructions to assign a different dot pattern to each printer of a plurality of printers.

18. The system according to claim 17, the programming instructions comprise instructions to generate the Voronoi diagrams from the different dot patterns.

19. The system according to claim 18, the programming instructions comprise instructions to:

obtain another dot pattern contained on another printed document;

overlay the another dot pattern on the Voronoi diagrams;

select a second Voronoi diagram from the Voronoi diagrams based on the another dot pattern; and identify another printer which is associated with the second Voronoi diagram that was selected from the Voronoi diagrams;

wherein the another printer generated the another printed document.

20. The system according to claim 12, wherein the dot pattern was printed on first documents by the printer during a first period of time and another different dot pattern was printed on second documents by the printer during a second period of time; and the programming instructions comprise instructions to identify when the printer printed one of the second documents based on results from analyzing the Voronoi diagram with the another different dot pattern overlaid thereon.

* * * * *